Patented Dec. 21, 1926.

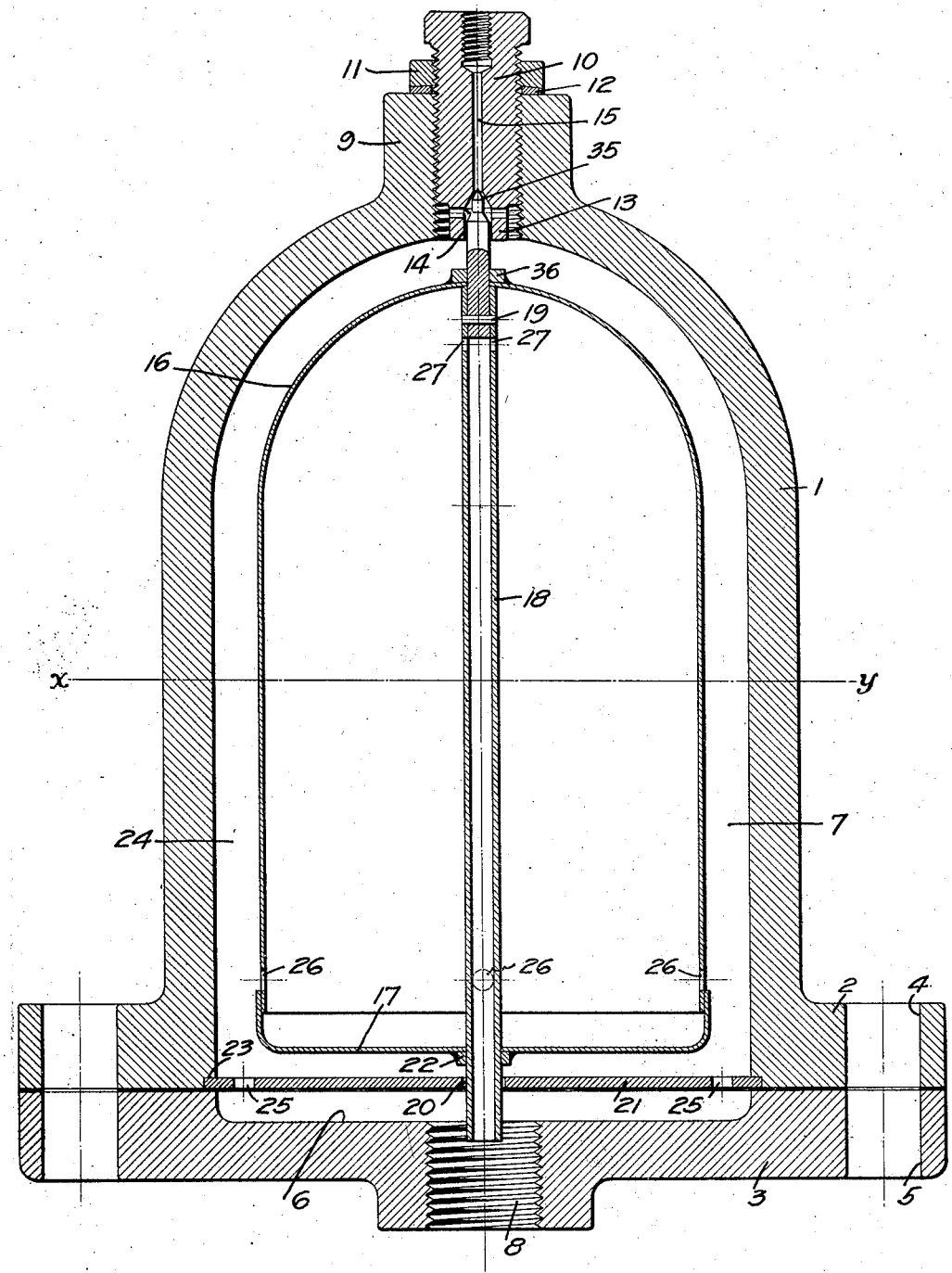

1,611,458

UNITED STATES PATENT OFFICE.

AUGUSTUS KEMPKEY, OF PIEDMONT, CALIFORNIA.

AIR VALVE FOR WATER-PIPE LINES AND THE LIKE.

Application filed August 29, 1925. Serial No. 53,397.

This invention relates to a valve for automatically releasing air from water pipe lines under pressure and has for its object the provision of an improved device of this character. More particularly, the invention relates to a valve of this character which is actuated by a float within an air collecting chamber in communication with the water pipe line. Heretofore, the weight of the float for operating the valve has been constant, and since the pressure in a water pipe line varies at different points, it has been necessary to provide different floats for the air valves in the line. It is therefore an object of this invention to provide a valve of the character described having a float of universal application; that is, the same float is adapted to operate under any pressure within the system. To this end, I provide a float the weight of which is automatically varied in accordance with the pressure within the water pipe line at that point.

The invention possesses other advantageous features, some of which with the foregoing will be set forth at length in the following description where I shall outline in full that form of the invention which I have selected for illustration in the drawings accompanying and forming part of the present specification. In said drawings I have shown but one form of my invention, but I do not desire to be limited thereto, since the invention as expressed in the claim may be embodied in a plurality of other forms.

In the drawings, the figure is a vertical sectional view of an air valve embodying my invention.

The invention comprises a heavy cylindrical casing 1 which is dome-shaped at its upper end and open at its bottom. The casing 1 is formed with a peripheral flange 2, which forms a base and provides means for securing the same to a base plate 3, the flange 2 and plate 3 being provided with a plurality of coinciding apertures 4 and 5 respectively to receive bolts for securing the same together. On its upper surface, the base plate 3 is provided with a circular recess 6 of the same diameter as the inside diameter of the casing 1 and positioned to coincide therewith. The casing 1 and base plate 3 form a closed chamber 7, which is placed in communication with the water pipe line. For this purpose, the base plate 3 is provided with an internally threaded central opening 8 to receive a threaded pipe connecting with the pipe line in a manner readily understood.

The upper end of the casing 1 is formed with an internally threaded collar 9 to receive a threaded valve member 10, which may be adjusted to any position therein and locked in its position by means of a lock nut 11. Preferably a lead gasket 12 is interposed between the lock nut 11 and the edge of collar 9. The inner end of the valve member 10 is reduced in diameter as indicated at 13, and provided with a central bore 14, which extends a slight distance into the said valve member. The bottom of the bore 14 is preferably conical and communicates with a small air passage 15 which extends centrally through the member 10. As shown in the drawing, the opening in collar 9 and the opening 8 are concentric with the vertical axis of the casing 1. The conical bottom of bore 14 forms a valve seat for the valve closing member or head 35 which is carried on a float 16 positioned within the chamber 7. The float 16 is in the form of a hollow dome-shaped container, preferably spun from copper and its contour is similar to that of the chamber 7. The open end of the float 16 is closed by a bottom member 17 as shown in the figure. A pipe 18 is positioned axially within the float 16, and at its upper end receives the valve head 35 which extends through the float 16. Preferably, the valve head 35 is provided with a reinforcing collar 36 adjacent the exterior surface of the float and is secured to the pipe 18 by a pin 19. The lower end of the pipe 18 extends through the bottom 17 and extends through an aperture 20 in a plate 21 into the opening 8. A reinforcing collar 22 is also provided for the pipe 18 adjacent the exterior surface of the bottom 17. The plate 21 is supported on the edge of the base plate 3, the casing 1 being suitably cut away at 23 to accommodate the same, and forms a wall within the chamber 7 dividing the recess 6 from the remainder of the chamber. The float 16 is of reduced size so as to leave a uniform passage or space designated 24 between its exterior surface and the wall of chamber 7, extending from its bottom upwardly over its dome. The wall 21 is provided with a plurality of apertures 25 positioned below the passage 24. The float 16 is also provided with a plurality of apertures 26 in its side wall near its bottom, said apertures being positioned in the same horizontal plane and placing the passage 24 in communication with the interior of the float. The pipe 18 is also provided with apertures 27 at its upper end adjacent the end of valve head 35 which place the pipe in communication with the interior of the float.

Having described the structural details of an apparatus embodying my invention, I shall proceed to describe its operation. When the opening 8 is connected with a water pipe line under pressure initially, the chamber 7 and float 16 are full of air and the valve is open. The head 35 is moved to its seat by the float 16 which rises as soon as sufficient water has entered the chamber 7. Water enters the recess 6 through aperture 8 from which it enters the passage 24 through apertures 25. The level of the water in the chamber 7 rises until the buoyancy of the float exceeds its weight, at which time the float raises, closing the valve. Any air in the water pipe, at the point where the relief device is connected, will enter the chamber, accumulating in the dome-shaped upper end thereof, displacing and forcing the water downwardly in the passage 24, as the water level falls, the buoyancy of the float decreases, and when the weight of the float exceeds its buoyancy, the float moves downward, opening the valve and permitting the discharge of air, which causes the water to rise and again close the valve. Water also enters the float through the apertures 26 until the pressure of the air within the float is equal to the hydrostatic pressure in the water pipe line. Since the weight of the float is determined by the amount of water contained therein and since such amount of water is a function of the hydrostatic pressure, it is apparent that the weight of the float automatically varies with the pressure of the water. The seat area pressure of the valve is a function of the water pressure, so that a greater weight is required to open the valve when the water pressure is increased. Since the water pressure differs materially at different parts of a long pipe line extending across the country, it has been necessary in the past to provide a float of different weight for each different pressure, in order to overcome seat area pressure and insure the proper operation of the valve. By constructing the float so that its weight is a function of the water pressure, it is not only possible to use the same float in relief devices operating under different pressures, but variations in water pressure, after the installation of the devices, will not interfere with the proper operation of the valve. In practice I have found that regardless of the pressure within the chamber, the float operated to open the valve when the water in the chamber recedes to the lever indicated by the line $x$—$y$. By arranging the apertures 25 directly under the passage 24, all of the air tends to rise in said passage without passing under the bottom 17 of the float. To prevent the float from becoming water-logged, the apertures 27 in pipe 18 have been provided, which permit a sufficient supply of air to enter the float through the aperture 8. After the air has escaped from the chamber 7, the same is again filled with water, the valve being closed by the water raising the float. From the foregoing, it will be seen that the operation of the valve is a function of the pressure in the water pipe line.

I claim:

A device of the character described comprising a cylindrical chamber having means at its bottom for communicating with a water pipe line under pressure, a valve in said chamber, a closed hollow float within said chamber for operating said valve, a vertical pipe within said float extending through the bottom thereof, said pipe having apertures adjacent its upper end communicating with the interior of the float, and water inlets in the side of said float near the bottom thereof.

In testimony whereof, I have hereunto set my hand.

AUGUSTUS KEMPKEY.